(12) United States Patent
Nakamura et al.

(10) Patent No.: US 9,661,249 B2
(45) Date of Patent: May 23, 2017

(54) IMAGE CAPTURING APPARATUS AND IMAGE CAPTURING SYSTEM WITH VARIABLE GAIN

(71) Applicant: CANON KABUSHIKI KAISHA, Tokyo (JP)

(72) Inventors: Kohichi Nakamura, Kawasaki (JP); Tetsuya Itano, Sagamihara (JP); Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/681,968

(22) Filed: Apr. 8, 2015

(65) Prior Publication Data

US 2015/0296163 A1    Oct. 15, 2015

(30) Foreign Application Priority Data

Apr. 11, 2014   (JP) .................................. 2014-082028

(51) Int. Cl.
*H04N 5/378*   (2011.01)
*H04N 5/357*   (2011.01)
*H04N 5/363*   (2011.01)

(52) U.S. Cl.
CPC ........... *H04N 5/378* (2013.01); *H04N 5/3575* (2013.01); *H04N 5/363* (2013.01)

(58) Field of Classification Search
None
See application file for complete search history.

(56) References Cited

U.S. PATENT DOCUMENTS

| | | | | |
|---|---|---|---|---|
| 6,873,364 | B1* | 3/2005 | Krymski | H04N 5/3575 348/300 |
| 2005/0057389 | A1* | 3/2005 | Krymski | H03K 4/026 341/169 |
| 2008/0030595 | A1* | 2/2008 | Murakami | H04N 3/1512 348/222.1 |
| 2009/0167915 | A1* | 7/2009 | Hirota | H04N 5/357 348/302 |

(Continued)

FOREIGN PATENT DOCUMENTS

| | | |
|---|---|---|
| JP | 2007-181088 A | 7/2007 |
| JP | 2009-177797 A | 6/2009 |

*Primary Examiner* — Justin P Misleh
(74) *Attorney, Agent, or Firm* — Canon USA, Inc. IP Division

(57) ABSTRACT

An image capturing apparatus includes: plural pixels arranged in matrix, each outputting a signal from a photoelectric conversion element; and plural readout circuits each provided for a corresponding column of the pixels, signals from the pixels being input to the readout circuits. The readout circuit includes an amplifier unit configured to amplify the signal from the pixel, and have a variable gain, and a hold capacitance connected to an output terminal of the amplifier unit via a sampling switch, and having a variable capacitance value. When the variable gain of the amplifier unit is set to be a first gain, the variable capacitance value of the hold capacitance is set to be a first capacitance value. When the variable gain is set to be a second gain larger than the first gain, the variable capacitance value is set to be a second capacitance value smaller than the first capacitance value.

9 Claims, 8 Drawing Sheets

(56) References Cited

U.S. PATENT DOCUMENTS

| | | | |
|---|---|---|---|
| 2011/0095169 A1* | 4/2011 | Takenaka | H04N 5/3658 250/208.1 |
| 2011/0155890 A1* | 6/2011 | Egawa | H04N 5/3575 250/208.1 |
| 2015/0124138 A1* | 5/2015 | Ueda | H04N 5/378 348/308 |
| 2015/0156413 A1* | 6/2015 | Do | H04N 5/357 348/218.1 |

* cited by examiner

IMAGE CAPTURING APPARATUS AND IMAGE CAPTURING SYSTEM WITH VARIABLE GAIN

BACKGROUND

Field of the Disclosure

The present Disclosure relates to an image capturing apparatus and an image capturing system used in, for example, scanners, video cameras, and digital still cameras.

Description of the Related Art

Japanese Patent Laid-Open No. 2007-181088 discloses a technique to increase speed and reduce noise by a column signal amplifying unit with which gain is switchable, hold capacitance, and a noise removal circuit that has clamp capacitance with which a capacitance value is switchable. In the technique disclosed in Japanese Patent Laid-Open No. 2007-181088, in a mode in which a high operation speed is required, the capacitance value of the clamp capacitance is lowered, and time necessary for the clamping is shortened, thereby increasing the speed. On the other hand, in a mode in which a low noise is required, the capacitance value of the clamp capacitance is increased, and kT/C noise of the clamp capacitance is reduced, thereby reducing the noise.

Japanese Patent Laid-Open No. 2007-181088 has the following two problems. First, a signal amplified by a column signal amplifying unit attenuates due to a combined capacitance of the clamp capacitance and the hold capacitance. Second, a gain determined by the column signal amplifying unit and the noise removal circuit, and the capacitance value reduces noise cannot be determined independently.

SUMMARY

An image capturing apparatus includes: a plurality of pixels arranged in a matrix form, each of the pixels outputting a signal from a photoelectric conversion element; and a plurality of readout circuits each provided for a corresponding column of the pixels, signals from the pixels being input to the readout circuits, wherein the readout circuit includes an amplifier unit configured to amplify the signal from the pixel, and have a variable gain, and a hold capacitance connected to an output terminal of the amplifier unit via a sampling switch, and having a variable capacitance value, wherein, when the variable gain of the amplifier unit is set to be a first gain, the variable capacitance value of the hold capacitance is set to be a first capacitance value and, when the variable gain of the amplifier unit is set to be a second gain larger than the first gain, the variable capacitance value of the hold capacitance is set to be a second capacitance value smaller than the first capacitance value.

Further features of the present invention will become apparent from the following description of exemplary embodiments with reference to the attached drawings.

DESCRIPTION OF THE EMBODIMENTS

First Embodiment

Figure 1:
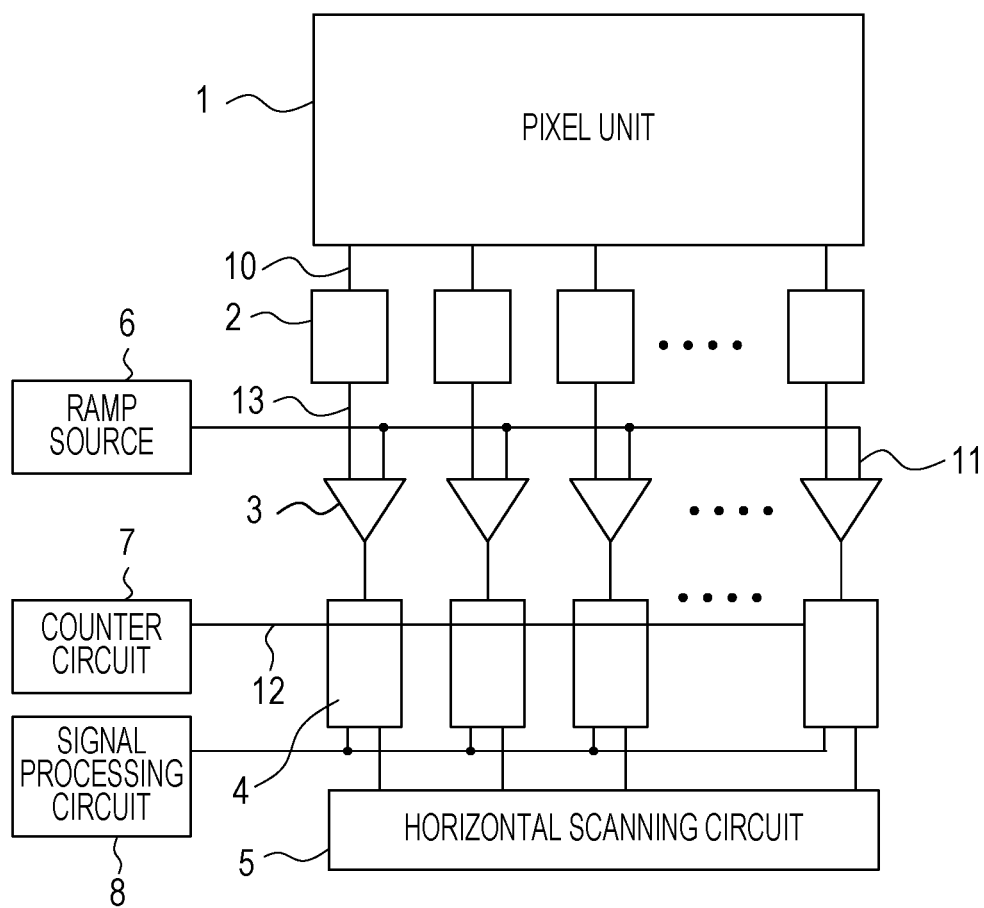
FIG. 1 is a diagram illustrating an exemplary configuration of an image capturing apparatus.

FIG. 1 is a diagram illustrating an exemplary configuration of an image capturing apparatus according to a first embodiment of the present invention. The image capturing apparatus is provided with a pixel unit 1, column readout circuits 2, comparators 3, storage units 4, a horizontal scanning circuit 5, a ramp source 6, a counter circuit 7, and a signal processing circuit 8. The pixel unit 1 is provided with a plurality of pixels 30 arranged in a two-dimensional matrix form (see FIG. 3). Each of a plurality of pixel output lines 10 is connected in common to the pixel 30 of each column. Each of a plurality of column readout circuits 2 is provided for each column of the pixel 30. An input terminal of the column readout circuit 2 is connected to a pixel output line 10 of each column, and an output terminal is connected to a column readout circuit output line 13 of each column. That is, the column readout circuit 2 inputs an output signal of the pixel 30. The ramp source 6 generates a ramp signal (a reference signal) of which level changes with time, and outputs the ramp signal to a ramp wire 11. The reference signal is not limited to the ramp signal but may be a signal of which level changes stepwise with time. Each of a plurality of comparators 3 is provided for each column of the pixel 30. The comparator 3 compares a signal of the column readout circuit output line 13 of each column with the ramp signal of the ramp wire 11, and outputs a comparison result. The counter circuit 7 counts a counted value and outputs counter data to a count data wire 12. Each of a plurality of storage units 4 is provided for each column of the pixel 30. The storage unit 4 holds the count data of the count data wire 12 in accordance with the comparison result of the comparator 3 of each column. The horizontal scanning circuit 5 sequentially outputs digital data stored in the storage unit 4 of each column to the signal processing circuit 8.

The column readout circuit 2 outputs a noise signal of the pixel 30 in a reset state, and a pixel signal based on photoelectric conversion of the pixel 30. The comparator 3 compares the magnitude of the output signal of the column readout circuit 2 and the magnitude of the ramp signal of the ramp wire 11. When the magnitude of the output signal of the column readout circuit 2 and the magnitude of the ramp signal of the ramp wire 11 are reversed, the output signal is reversed from a high level to a low level or from a low level to a high level. At timing at which the output signal of the comparator 3 is reversed, the storage unit 4 stores the digital data output from the counter circuit 7. The comparator 3 performs the above-described comparison twice with the noise signal and the pixel signal based on photoelectric conversion, and the storage unit 4 stores the digital data of the noise signal and the digital data of the pixel signal based on photoelectric conversion. The storage unit 4 is provided with a storage unit for the noise signal and a storage unit for the pixel signal based on photoelectric conversion. An AD conversion unit is provided with the comparator 3, the storage unit 4, the ramp source 6, and the counter circuit 7, and converts an analog output signal of the column readout circuit 2 into a digital signal. The noise signal and digital data of the pixel signal based on photoelectric conversion stored in the storage unit 4 are sequentially transferred to the signal processing circuit 8 for each column in accordance with the signal output from the horizontal scanning circuit 5. The signal processing circuit 8 subtracts the digital data corresponding to the noise signal and the digital data corresponding to the pixel signal based on photoelectric conversion, and implements digital correlated double sampling (CDS).

Figure 2:
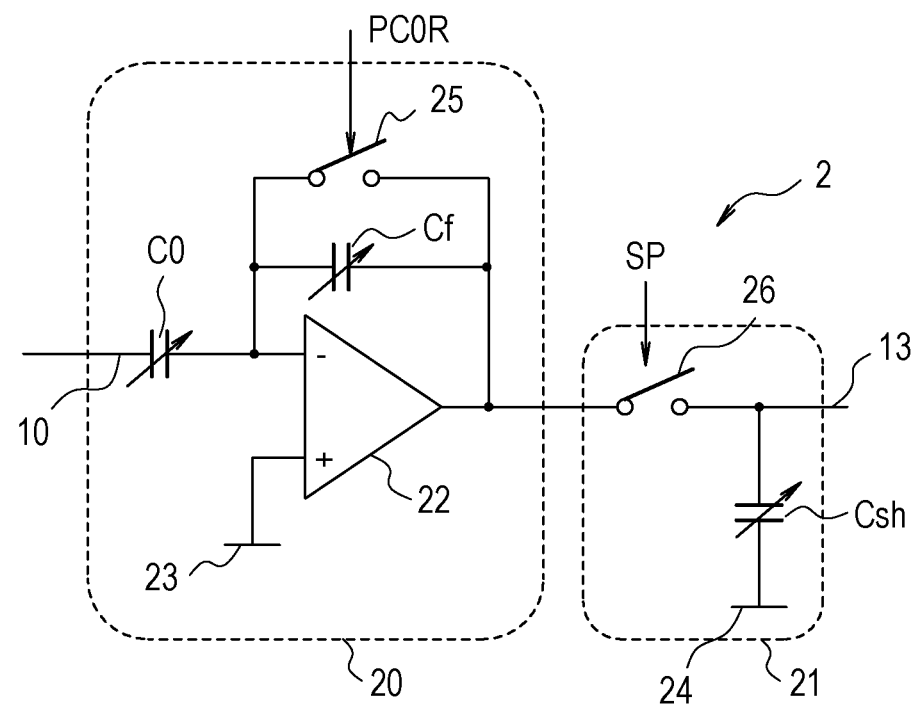
FIG. 2 is a diagram illustrating an exemplary configuration of a column readout circuit.

FIG. 2 is a circuit diagram illustrating an exemplary configuration of the column readout circuit 2. The column readout circuit 2 is provided with a column amplifier unit 20 and a sample/hold unit 21. The column amplifier unit 20 is an inverting amplifier, and is provided with a column amplifier 22, input capacitance C0, feedback capacitance Cf, and a reset switch 25. The column amplifier 22 is a differential amplifier circuit. A reference potential line 23 is connected to a non-inverting input terminal of the column amplifier 22. A first terminal of input capacitance C0, a first terminal of feedback capacitance Cf, and a first terminal of a reset switch 25 are connected to an inverting input terminal of the column amplifier 22. An output terminal of the column amplifier 22 is connected to a second terminal of the feedback capacitance Cf, to a second terminal of the reset switch 25, and to an input terminal of the sample/hold unit 21. A second terminal of the input capacitance C0 is an input terminal of the column amplifier unit 20, which is connected to the pixel output line 10. A gain of the column amplifier unit 20 is determined by a ratio between a capacitance value of the input capacitance C0 and a capacitance value of the feedback capacitance Cf. Since the column amplifier unit 20 is an inverting amplifier, the gain is −C0/Cf. Here, the capacitance value of the input capacitance C0 and the capacitance value of the feedback capacitance Cf are switchable and, therefore, the gain of the column amplifier unit 20 is switchable. Even if one of the capacitance values of the input capacitance C0 and the capacitance value of the feedback capacitance Cf is switchable, the gain of the column amplifier unit 20 is switchable.

As described above, the column amplifier unit 20 amplifies the output signal of the pixel 30 with a variable gain.

The sample/hold unit 21 is provided with hold capacitance Csh and a sampling switch 26. A first terminal of the sampling switch 26 is connected to an output terminal of the column amplifier unit 20, and a second terminal of the sampling switch 26 is connected to the hold capacitance Csh. A wire to which the sampling switch 26 and the hold capacitance Csh are connected is an output line of the sample/hold unit 21, and is a column readout circuit output line 13. The capacitance value of the hold capacitance Csh is switchable, and the hold capacitance Csh is connected between the column readout circuit output line 13 and a fixed potential line 24. That is, the sample/hold circuit Csh is connected to the output terminal of the column amplifier unit 20 via the sampling switch 26, and the capacitance value thereof is variable. An operation of the column readout circuit 2 is described later.

Figure 3:
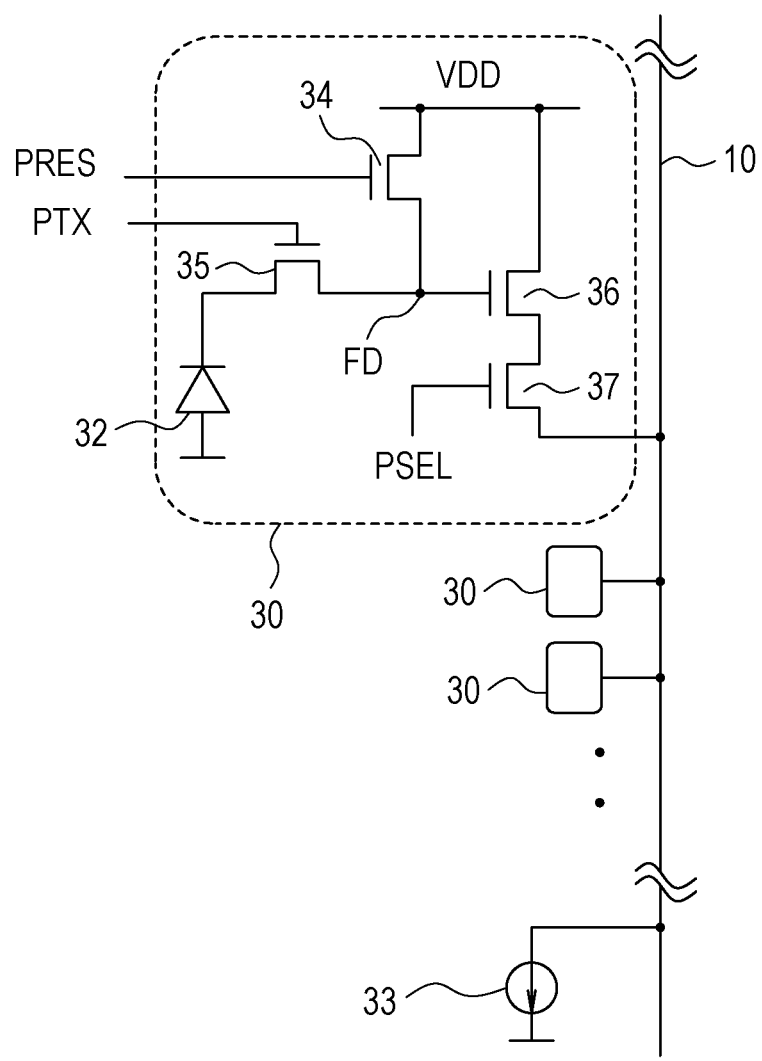
FIG. 3 is a diagram illustrating an exemplary configuration of a pixel.

FIG. 3 is a circuit diagram illustrating an exemplary configuration of the pixel unit 1. The pixel unit 1 is provided with the pixels 30 and a current source 33. A plurality of pixels 30 are arranged in a two-dimensional matrix form. The pixels 30 and the current source 33 of each column are connected to the pixel output line 10 of each column. The pixel 30 is provided with a photoelectric conversion element 32, a reset transistor 34, a transfer transistor 35, a source follower transistor 36, and a selection transistor 37. The photoelectric conversion element 32 generates charge in accordance with an incident light quantity by photoelectric conversion. In the pixel 30 of a readout row, a signal PSEL is set to high level and the selection transistor 37 is turned ON. At this time, a source follower is formed by the source follower transistor 36 and the current source 33. At the time of readout, a signal PRES is set to high level, the reset transistor 34 is turned ON, and a floating diffusion FD is reset to a power supply voltage VDD. After the reset, the signal PRES is set to low level and the reset transistor 34 is turned OFF. Then, a signal PTX is set to a high level, the transfer transistor 35 is turned ON, and the charge accumulated in the photoelectric conversion element 32 is transferred to the floating diffusion FD. The source follower transistor 36 outputs, to the pixel output line 10 via the selection transistor 37, a voltage in accordance with an amount of charge accumulated in the floating diffusion FD. Until the signal PTX transitions from a low level to a high level, the noise signal of the pixel 30 in the reset state is output to the pixel output line 10. After the signal PTX transitions to a high level, the pixel signal based on photoelectric conversion of the photoelectric conversion element 32 is output to the pixel output line 10. As described above, a plurality of pixels 30 are arranged in a matrix form, and output signals by the photoelectric conversion element 32.

Figure 4:
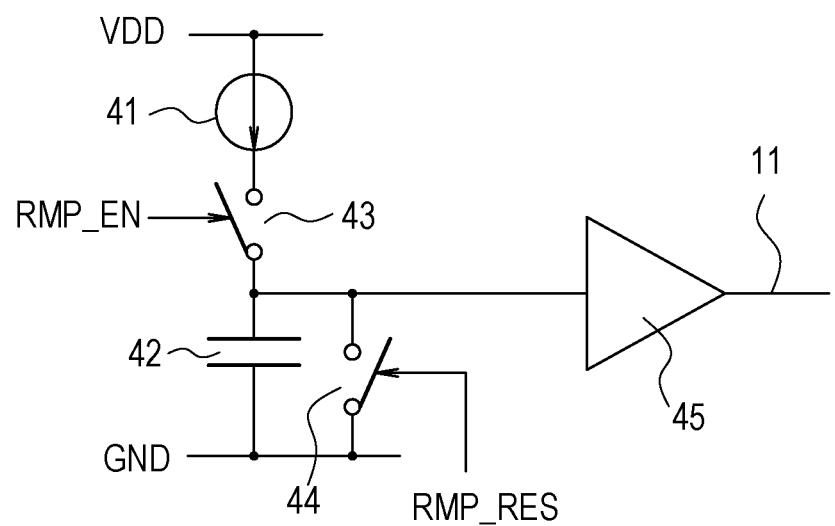
FIG. 4 is a diagram illustrating an exemplary configuration of a circuit that generates a ramp signal.

FIG. 4 is a circuit diagram illustrating an exemplary configuration of the ramp source 6. The ramp source 6 is provided with a current source 41, a charge capacity 42, a charge switch 43, a discharge switch 44, and an output buffer 45, and generates a ramp signal. An output terminal of the output buffer 45 is connected to the ramp wire 11. On/off of the charge switch 43 is controlled by a signal RMP_EN. On/off of the discharge switch 44 is controlled by a signal RMP_RES. The charge switch 43 is turned ON when the control signal RMP_EN is at a high level and the discharge switch 44 is turned ON when the control signal RMP_RES is at a high level. When analog-to-digital (AD) conversion is performed, the signal RMP_EN is set to a high level and the signal RMP_RES is set to a low level. Then, the charge switch 43 is turned ON, the discharge switch 44 is turned OFF, and charging to the charge capacity 42 from the current source 41 is started. In a period in which the signal RMP_EN is at a high level and the signal RMP_RES is at a low level, since charge corresponding to a current amount of the current source 41 is continuously accumulated in the charge capacity 42, a ramp signal of which potential increases with elapsed time is input in an input terminal of the output buffer 45. This ramp signal is supplied to a comparator 3 of each column via the output buffer 45 and the ramp wire 11. This period is an AD conversion period. After AD conversion is completed, the signal RMP_EN is set to a low level and the signal RMP_RES is set to a high level. Then, the charge switch 43 is turned OFF, discharge switch 44 is turned ON, the charge accumulated in the charge capacity 42 is discharged, and the ramp signal is reset to prepare for the next AD conversion. When the ramp signal is reset, the potential input in the output buffer 45 is a ground potential, and the output potential of the output buffer 45 at that time is set to Vst (see FIG. 5). The digital CDS described above is implemented by repeating the period in which the ramp signal is generated and the period in which the ramp signal is reset by AD conversion of the noise signal and AD conversion of the pixel signal based on photoelectric conversion.

Figure 5:
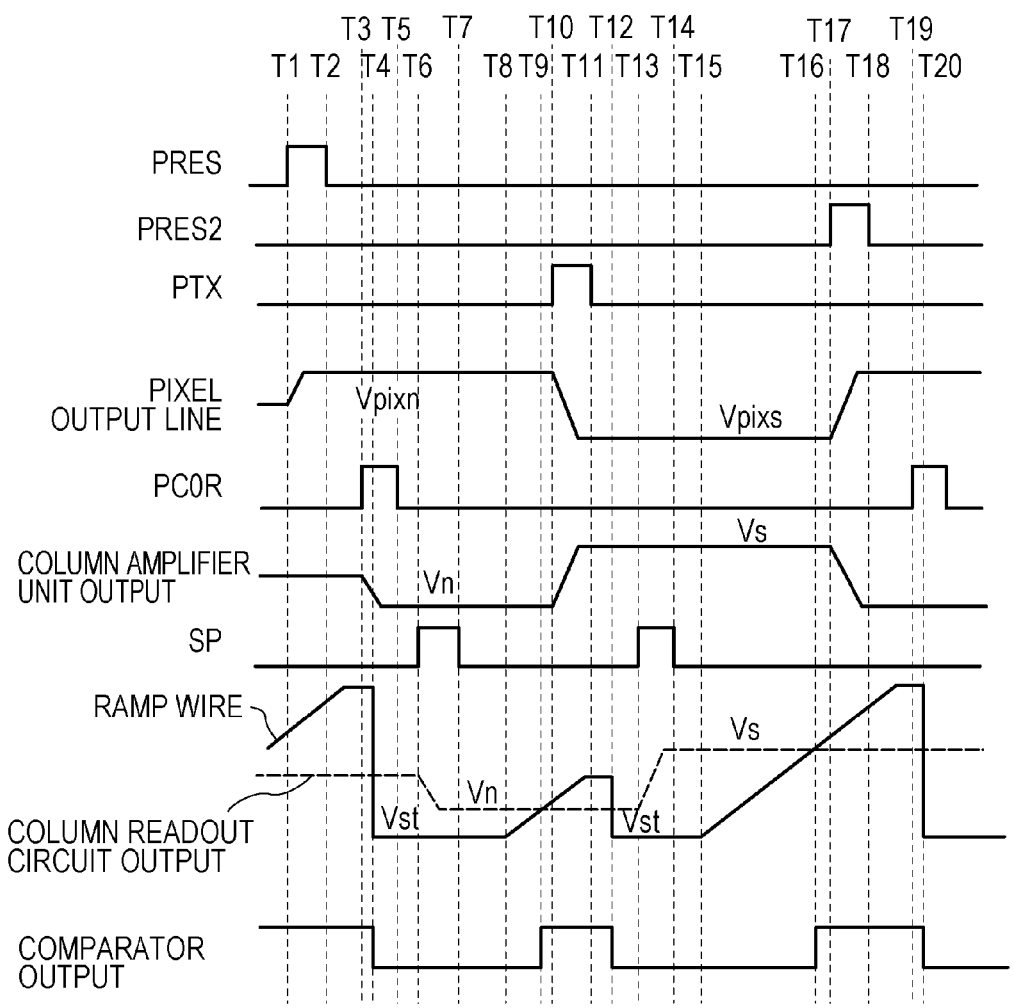
FIG. 5 is a timing chart for describing an operation of the column readout circuit.

FIG. 5 is a timing chart illustrating a driving method of the image capturing apparatus. The counter circuit 7 may perform a count operation during an AD conversion period of the noise signal and the pixel signal based on photoelectric conversion. The storage unit 4 may write in the AD conversion period of the noise signal and the pixel signal based on photoelectric conversion. The AD conversion period of the noise signal and the pixel signal based on photoelectric conversion is a period in which the ramp signal is input in the ramp wire 11 as described above. The signal PRES and the signal PTX are the signal PRES and the signal PTX of the pixel 30 of the n-th row, respectively. A signal PRES2 denotes the signal PRES of the pixel 30 of the (n+1)th row. Hereinafter, an operation of the pixel 30 of the n-th row is described as an example. The selection transistor 37 of the pixel 30 of the n-th row is turned ON. Supposing that, when the potential of the ramp wire 11 becomes larger than the potential of the column readout circuit output line 13, the output signal of the comparator 3 transitions from a low level to a high level.

First, at time T1, the signal PRES transitions from a low level to a high level, the reset transistor 34 of the pixel 30 in the readout row is turned ON, and a reset operation of the pixel 30 in the readout row is started. At this time, the potential of the pixel output line 10 transitions from a pixel signal of the previous row to a noise signal Vpixn of the readout row. Since AD conversion of the pixel signal based on photoelectric conversion of the previous row is performed at this time, the ramp signal is input in the ramp wire 11. In this example, since the potential of the ramp wire 11 is larger than the potential of the column readout circuit output line 13 at time T1, the output signal of the comparator 3 is at a high level.

At time T2, the signal PRES is set to a low level, the reset transistor 34 of the pixel 30 in the readout row is turned OFF, and the reset operation of the pixel 30 in the readout row is completed. At time T3, a column amplifier unit reset signal PC0R transitions from a low level to a high level, the reset switch 25 is turned ON, and a reset operation of the column amplifier unit 20 is started. At this time, the output potential of the column amplifier unit 20 transitions from a potential corresponding to the pixel signal of the previous row to a potential Vn. In a column amplifier unit reset period, the column amplifier unit 20 becomes a voltage follower and, therefore, the potential Vn becomes substantially equal to the potential of the reference potential line 23.

At time T4, the ramp signal is reset by the signal RMP_RES and the potential of the ramp wire 11 transitions to Vst. At this time, since the potential of the column readout circuit output line 13 becomes larger than the potential Vst of the ramp signal, the output signal of the comparator 3 is set to a low level. At time T5, the signal PC0R is set to a low level, the reset switch 25 is turned OFF, and the reset operation of the column amplifier unit 20 is completed.

At time T6, a sampling control signal SP is set to a high level, the sampling switch 26 is turned ON, and an output potential Vn of the column amplifier unit 20 is sampled by the hold capacitance Csh. Therefore, the potential of the noise signal that is the output signal of the column readout circuit 2 is set to Vn. At time T7, the sampling control signal SP is set to a low level, the sampling switch 26 is turned OFF, and sampling is completed.

At time T8, by the signal RMP_EN, an increase in the potential of the ramp signal of the ramp wire 11 is started, and AD conversion of the noise signal is started. At this time, the counter circuit 7 starts the count operation of the counted value. When the potential of the ramp wire 11 becomes larger than the potential Vn of the column readout circuit output line 13, the output signal of the comparator 3 transitions from a low level to a high level. Supposing that this time is time T9, a digital value corresponding to the noise signal may be obtained by storing, in the storage unit 4 as count data, the counted value counted by the counter circuit 7 corresponding to time T9. After the AD conversion period of a certain predetermined noise signal ends, the counter circuit 7 stops the operation and the counted value is reset to 0 before the next AD conversion is performed.

At time T10, the signal PTX of the pixel 30 in the readout row is set to a high level, the transfer transistor 35 of the pixel 30 in the readout row is turned ON, and charge by photoelectric conversion of the photoelectric conversion element 32 is transferred to the floating diffusion FD. The pixel signal based on photoelectric conversion is output to the pixel output line 10, and the potential of the pixel output line 10 is set to Vpixs. Supposing that the output potential of the column amplifier unit 20 at this time is Vs, the following equation holds: $Vs-Vn=-(Vpixs-Vpixn) \times C0/Cf$. As described above, since the column amplifier unit 20 is an inverting amplifier, the right side has been multiplied by $-1$.

At time T11, the signal PTX of the pixel 30 in the readout row is set to a low level, the transfer transistor 35 of the pixel 30 in the readout row is turned OFF, and charge transfer is completed. At time T12, by the signal RMP_RES, the ramp signal is reset and the potential of the ramp wire 11 is set to Vst.

At time T13, the sampling control signal SP is set to a high level, the sampling switch 26 is turned ON, and a sampling operation to the hold capacitance Csh is started. By this sampling operation, a potential Vs is sampled in the hold capacitance Csh. Therefore, the potential of the pixel signal based on photoelectric conversion in the column readout circuit output line 13 is Vs.

At time T14, the sampling control signal SP is set to a low level, the sampling switch 26 is turned OFF, and the hold capacitance Csh holds the potential Vs of the pixel signal based on photoelectric conversion.

At time T15, to start AD conversion of the pixel signal based on photoelectric conversion, by the signal RMP_EN, an increase in the potential of the ramp signal in the ramp wire 11 is started, and the counter circuit 7 starts a count operation of the counted value. When the potential of the ramp wire 11 becomes larger than the potential of the column readout circuit output line 13, the output signal of the comparator 3 transitions from a low level to a high level. Supposing that this time is time T16, a digital value of the pixel signal based on photoelectric conversion may be obtained by storing, the storage unit 4 as count data, the counted value of the counter circuit 7 corresponding to the time T16.

At time T17, a reset control signal PRES2 of the pixel 30 in the next row is set to a high level, the reset transistor 34 of the pixel 30 in the next row is turned ON, and a reset operation of the pixel 30 in the next row is started. An operation of the pixel 30 in the next row is the same as the operation of the pixel 30 of the readout row described above. At time T18, the signal PRES2 is set to a low level. At time T19, the signal PC0R is set to a high level.

At time T20, by the signal RMP_RES, the ramp signal of the ramp wire 11 is reset, and the potential is set to Vst. At the same time, since the potential of the column readout circuit output line 13 becomes larger than the potential of the ramp wire 11, the output signal of the comparator 3 transitions from a high level to a low level. After the AD conversion period of a certain predetermined pixel signal based on photoelectric conversion ends, the counter circuit 7 stops the operation and the counted value is reset to 0 before the next AD conversion is performed. After AD conversion of the pixel signal based on photoelectric conversion is completed, digital data corresponding to the noise signal and digital data corresponding to the pixel signal based on photoelectric conversion, which are stored in the storage unit 4, are transferred to the signal processing circuit 8, where the data is subtracted to perform the digital CDS.

In a noise signal period of time T1 to T10, the pixel 30 outputs a reset noise signal to the column amplifier unit 20, and the hold capacitance Csh samples and holds the output signal of the column amplifier unit 20. In a pixel signal period of time T10 to T17, the pixel 30 outputs the pixel signal based on photoelectric conversion to the column amplifier unit 20, and the hold capacitance Csh samples and holds the output signal of the column amplifier unit 20.

When the pixel 30 of the n-th row is outputting the reset noise signal, at time T6, the sampling switch 26 is turned ON, and the output signal of the column amplifier unit 20 is written in the hold capacitance Csh. Then, at time T7, the sampling switch 26 is turned OFF and the hold capacitance Csh holds the output signal of the column amplifier unit 20. Then, at time T8, the AD conversion period of the AD conversion unit is started. Then, at time T10, the pixel 30 of the n-th row outputs the pixel signal based on photoelectric conversion. Then, before time T11, the potential of the ramp signal is stabilized and the AD conversion period of the AD conversion unit ends.

When the pixel 30 of the n-th row is outputting the pixel signal based on photoelectric conversion, at time T13, the sampling switch 26 is turned ON, and the output signal of the column amplifier unit 20 is written in the hold capacitance Csh. Then, at time T14, the sampling switch 26 is turned OFF, and the hold capacitance Csh holds the output signal of the column amplifier unit 20. Then, at time T15, the AD conversion period of the AD conversion unit is started. Then, at time T17, the pixel 30 of the (n+1)th row outputs the reset noise signal. Then, before time T19, the potential of the ramp signal is stabilized and the AD conversion period of the AD conversion unit ends.

As described above, the output signals of the column amplifier unit 20 corresponding to the noise signal of the pixel 30 and the output signal of the column amplifier unit 20 corresponding to the pixel signal based on photoelectric conversion are sampled and held. As described above, when the sampling control signal SP is set to a high level, the sampling switch 26 is turned ON, and sampling of the output signal of the column amplifier unit 20 to the hold capacitance Csh is started. When the sampling control signal SP transitions to a low level, the sampling switch 26 is turned OFF, sampling of the output signal of the column amplifier unit 20 to the hold capacitance Csh is completed and is held. At this time, kT/C noise determined by the output noise of the column amplifier unit 20 and the capacitance value of the hold capacitance Csh is accumulated in the hold capacitance Csh. Here, if the hold capacitance Csh is increased, the operation frequency of the column amplifier unit 20 is lowered. Therefore, the output noise of the column amplifier unit 20 is reduced in accordance with the reduced bandwidth, and kT/C noise is also reduced. However, the operation speed of the column amplifier unit 20 is reduced in accordance with the lowered operation frequency. Therefore, if hold capacitance Csh is increased excessively large, there is a possibility that the operation of the column amplifier unit 20 is not completed in desired time. Therefore, the capacitance value of the hold capacitance Csh is set to an appropriate value.

Figure 6:
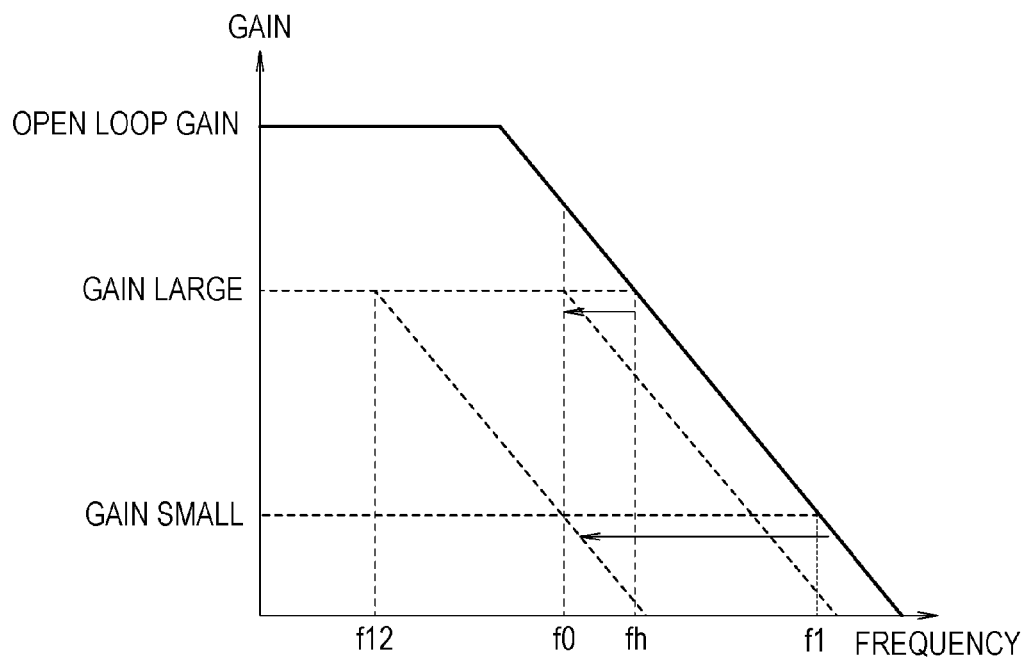
FIG. 6 is a diagram for describing a gain and an operation frequency.

FIG. 6 is a diagram illustrating a relationship between the gain and the frequency of the column amplifier unit 20. In particular, FIG. 6 illustrates an open loop gain of the column amplifier 22, and a frequency band and a gain when the gain of the column amplifier unit 20 is large and small. The solid line in FIG. 6 represents the open loop gain of the column amplifier 22 when load capacitance C1 (see FIG. 7) is connected to the output terminal of the column amplifier 22 as the capacitance Csh. Supposing that the capacitance value of the hold capacitance Csh connected to the output terminal of the column amplifier unit 20 is equal to the capacitance value of the load capacitance C1, when the gain is small, the maximum value of the operation frequency is f1 and, when the gain is large, the maximum value of the operation frequency is fh. Supposing that the frequency necessary for the operation of the column amplifier unit 20 is set to f0, when the gain is small, the frequency band is redundant by (f1−f0) and, when the gain is large, the frequency band is redundant by (fh−f0). That is, regarding the sampling and holding operation of the column readout circuit 2, since a noise band of the column amplifier 22 is increased in accordance with the redundancy of this frequency band and the increased noise band is sampled, noise is increased resultantly. Then, for example, when the gain of the column amplifier unit 20 is small, the capacitance value of the hold capacitance Csh is increased so that the frequency band of the column amplifier unit 20 is set to f0. Since the noise band of the column amplifier 22 is also restricted at this time, noise sampled by the hold capacitance Csh also becomes small. Since the capacitance value of the hold capacitance Csh becomes large, kT/C noise may also be reduced. If the gain of the column amplifier unit 20 is increased while keeping the magnitude of the capacitance value of the hold capacitance Csh, the frequency band when the gain is large is set to f12 as illustrated in FIG. 6. As illustrated in FIG. 6, since f12<f0, the frequency does not satisfy the necessary frequency. Therefore, at this time, the column amplifier unit 20 cannot perform the operation within desired time. Then, when the gain of the column amplifier unit 20 is large, the capacitance value of the hold capacitance Csh is reduced, as compared with the case when the gain of the column amplifier unit 20 is small. If the gain of the column amplifier unit 20 is a first gain, the capacitance value of the hold capacitance Csh is a first capacitance value. If the gain of the column amplifier unit 20 is a second gain, which is larger than the first gain, the capacitance value of the hold capacitance Csh is a second capacitance value, which is smaller than the first capacitance value. In the present embodiment, since a gain and an arbitrary capacitance value in accordance with the gain can be selected, the operation speed can be increased and noise can be reduced.

Regarding the magnitude of the hold capacitance Csh, it is desirable that the frequency fh is set to be equal to the frequency f0 that is necessary for the operation of the column amplifier unit 20. Noise can be reduced by restricting the noise band of the column amplifier unit 20 and reducing kT/C noise, while satisfying the necessary operation frequency f0.

Figure 7:
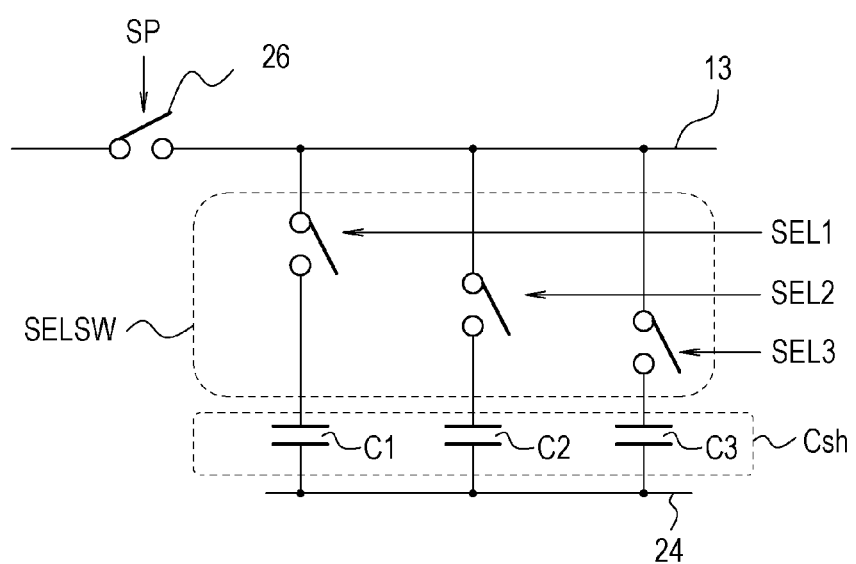
FIG. 7 is a diagram illustrating an exemplary configuration of a circuit that switches hold capacitance.

As described above, noise can be reduced and the operation speed can be increased by changing the capacitance value of the hold capacitance Csh in accordance with the gain of the column amplifier unit 20 and appropriately setting the frequency band of the column amplifier unit 20. The switch portion of the hold capacitance Csh may be constituted by, for example, a plurality of switches SELSW and a plurality of capacitances C1 to C3 as illustrated in FIG. 7. In accordance with capacitance selection signals SEL1 to SEL3, the switch SELSW may change the capacitance value of the hold capacitance Csh by selectively connecting the capacitances C1 to C3 to the column readout circuit output line 13 as the hold capacitance Csh. Alternatively, the switch SELSW may select two or more from among the capacitances C1 to C3.

The column amplifier 22 is a differential amplifier circuit in the description above but this is not restrictive. However, the column amplifier 22 may also be a grounded source amplifier. In that case, the reference potential line 23 is omissible. In the present embodiment, the noise signal output period of the readout row and the AD conversion period of the pixel signal based on photoelectric conversion of the previous row overlap each other and the pixel signal output period based on photoelectric conversion and the AD conversion period of the noise signal overlap each other, but this is not restrictive. For example, after the reset signal is output, the noise signal may be AD converted, then the pixel signal based on photoelectric conversion may be output, then the pixel signal based on photoelectric conversion may be AD converted, and then the reset signal of the next row may be output. In that case, the signal period output to the pixel output line 10 and the AD converted signal period correspond to each other.

Second Embodiment

Figure 8:
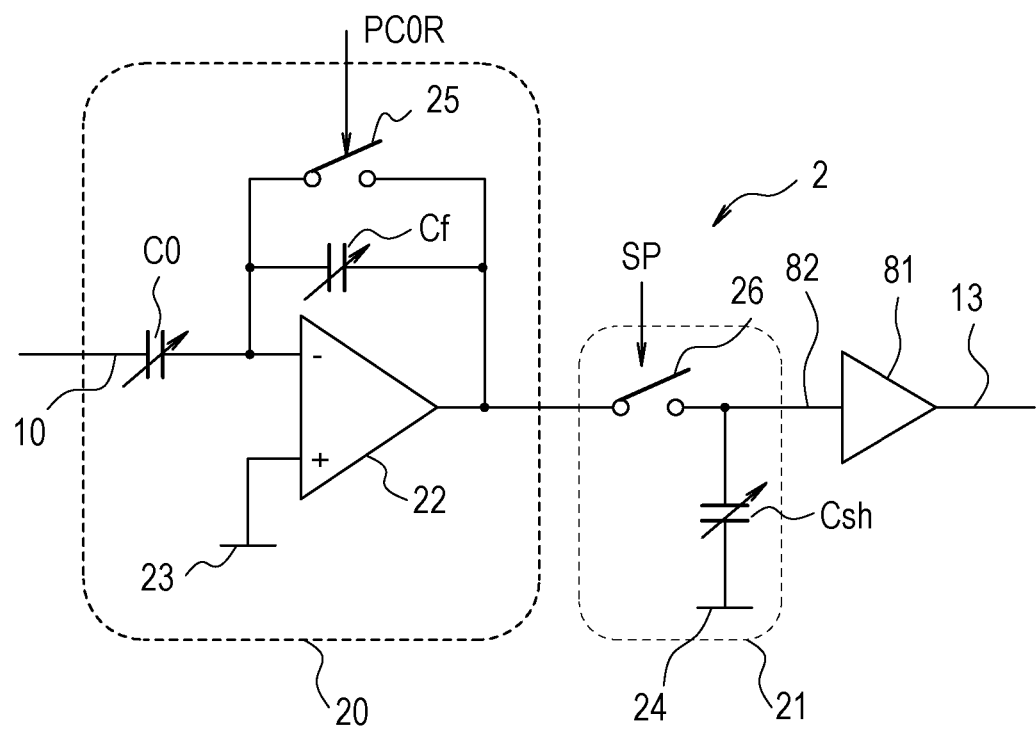
FIG. 8 is a diagram illustrating an exemplary configuration of a column readout circuit

FIG. 8 is a circuit diagram illustrating an exemplary configuration of a column readout circuit 2 according to a second embodiment of the present invention. Hereinafter, the present embodiment (see FIG. 8) is described regarding differences from the first embodiment (see FIG. 2). The column readout circuit 2 is provided with a column amplifier unit 20 with which a gain is switchable, a sample/hold unit 21, and a buffer circuit 81. An input wire 82 of the buffer circuit 81 is connected to a sampling switch 26 and hold capacitance Csh. An output terminal of the buffer circuit 81 is connected to an input terminal of a comparator 3 via a column readout circuit output line 13. Other connections are the same as those of the first embodiment. An operation of the present embodiment is the same as that of the timing chart illustrated in FIG. 5. A signal sampled by the hold capacitance Csh is output to the column readout circuit output line 13 via the buffer circuit 81. The buffer circuit 81 is, for example, a voltage follower using a differential amplifier circuit, or a source follower.

As in the first embodiment, a capacitance value of the hold capacitance Csh is reduced when the gain of the column amplifier unit 20 is large, and a capacitance value of the hold capacitance Csh is increased when the gain of the column amplifier unit 20 is small. Thus, kT/C noise and high frequency noise of the column amplifier unit 20 can be cut, while keeping the operation speed of the column readout circuit 2. That is, the operation speed is increased while noise is reduced. A switch portion of the capacitance value of the hold capacitance Csh may be implemented by, for example, a circuit of FIG. 7. By providing a buffer circuit 81 in the next step of the sample/hold unit 21, even if, for example, large capacitance load is connected to the column readout circuit output line 13, the buffer circuit 81 can drive the large capacitance load. Further, by providing the buffer circuit 81, an influence of noise caused when the output signal of the comparator 3 transitions from a high level to a low level or from a low level to a high level may be reduced.

That is, when the output signal of the comparator 3 is reversed, if the influence appears also in the input side of the comparator 3, that influence appearing in the input side of the comparator 3 is reduced because the buffer circuit 81 of low output impedance is driving the input side of the comparator 3. An influence on the hold capacitance Csh is also reduced. Not only noise in the comparator 3 but kickback noise of a digital circuit, such as a storage unit 4, connected to the next step is reduced by the buffer circuit 81.

Third Embodiment

Figure 9:
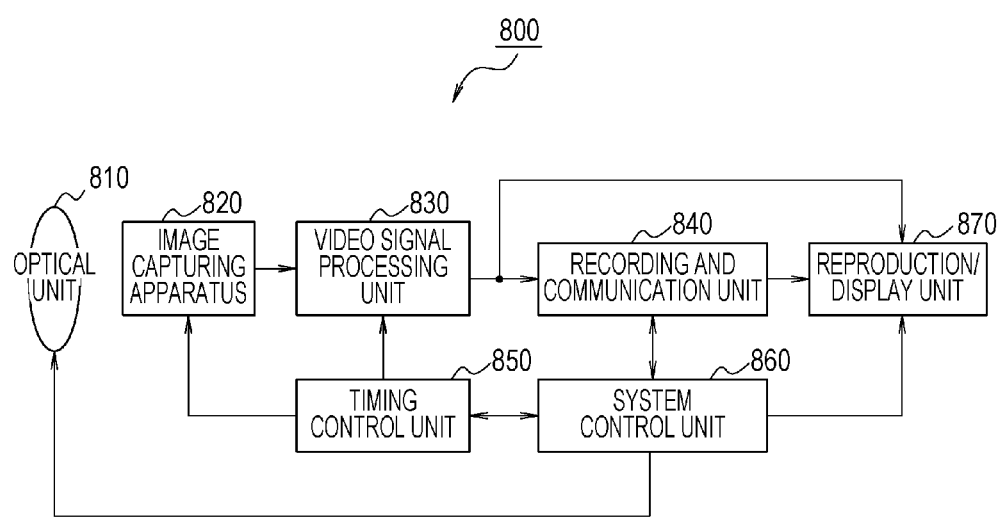
FIG. 9 is a diagram illustrating an exemplary configuration of an image capturing system.

FIG. 9 is a diagram illustrating an exemplary configuration of an image capturing system according to a third embodiment of the present invention. An image capturing system 800 is provided with, for example, an optical unit 810, an image capturing apparatus 820, an image signal processing unit 830, a recording/communication unit 840, a timing control unit 850, a system control unit 860, and a reproduction/display unit 870. The image capturing apparatus described in the previous embodiments is used as the image capturing apparatus 820. The optical unit 810, which is, for example, an optical system such as a lens, focuses light from a subject on a pixel unit 1 of the image capturing apparatus 820 in which a plurality of pixels 30 are arranged in a two-dimensional form and forms an image of the subject. The image capturing apparatus 820 outputs a signal in accordance with the light focused on the pixel unit 1 at timing based on the signal from the timing control unit 850. The signal output from the image capturing apparatus 820 is input in the image signal processing unit 830, and the image signal processing unit 830 performs signal processing in accordance with a method defined by, for example, a program. The signal obtained in the process by the image signal processing unit 830 is output to the recording/communication unit 840 as image data. The recording/communication unit 840 outputs a signal for forming an image to the reproduction/display unit 870, and causes the reproduction/display unit 870 to reproduce and display a moving image and a still image. The recording/communication unit 840 inputs the signal from the image signal processing unit 830, communicates with the system control unit 860, and records, in a recording medium, the signal for forming an image.

The system control unit 860 collectively controls an operation of the image capturing system, and controls driving of the optical unit 810, the timing control unit 850, the recording/communication unit 840, and the reproduction/display unit 870. The system control unit 860 is provided with a storage device, which is, for example, a recording medium. Programs and the like necessary to control the operation of the image capturing system are recorded in the storage device. The system control unit 860 supplies, to the image capturing system, a signal for switching driving modes in accordance with, for example, a user operation. Specific examples include a change in a row in which reading is started, a change in a row in which reset is made, a change in an angle of view as a result of electronic zooming, and a shift of an angle of view as a result of electronic image stabilization. The timing control unit 850 controls driving timing of the image capturing apparatus 820 and driving timing of the image signal processing unit 830 under the control of the system control unit 860.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-082028, filed Apr. 11, 2014 which is hereby incorporated by reference herein in its entirety.

What is claimed is:

1. An image capturing apparatus, comprising:
   a plurality of pixels arranged in a matrix form, each of the pixels outputting a signal from a photoelectric conversion element; and
   a plurality of readout circuits each provided for a corresponding column of the pixels, signals from the pixels being input to the readout circuits,
   wherein
   at least one of the readout circuits includes
      an amplifier unit configured to amplify the signal from a corresponding one of the pixels, and having a variable gain, and
      a hold capacitance connected to an output terminal of the amplifier unit via a sampling switch, and having a variable capacitance value,
   wherein,
   at a time when the variable gain of the amplifier unit is a first gain and the sampling switch is changed from an off state into an on state, the variable capacitance value of the hold capacitance is a first capacitance value and,
   at a time when the variable gain of the amplifier unit is a second gain larger than the first gain and the sampling switch is changed from the off state into the on state, the variable capacitance value of the hold capacitance is a second capacitance value smaller than the first capacitance value.

2. The image capturing apparatus according to claim 1, wherein,
   in a noise signal period,
   the corresponding pixel outputs a reset noise signal to the amplifier unit, and
   the hold capacitance samples and holds an output signal of the amplifier unit and in a pixel signal period,
   the corresponding pixel outputs, to the amplifier unit, a pixel signal based on photoelectric conversion, and
   the hold capacitance samples and holds the output signal of the amplifier unit.

3. The image capturing apparatus according to claim 2, further comprising an analog-to-digital (AD) conversion unit for converting the output signal from each of the pixels.

4. The image capturing apparatus according to claim 3, wherein,
   when a pixel of an n-th row is outputting a pixel signal based on the photoelectric conversion, the sampling switch is turned ON, the output signal of the amplifier unit is written in the hold capacitance,
   then the sampling switch is turned OFF, the hold capacitance holds the output signal of the amplifier unit,
   then an AD conversion period of the AD conversion unit is started,
   then a pixel of the (n+1)th row outputs the reset noise signal, and
   then the AD conversion period of the AD conversion unit ends.

5. The image capturing apparatus according to claim 3, wherein,
   when the corresponding pixel is outputting the reset noise signal, the sampling switch is turned ON, the output signal of the amplifier unit is written in the hold capacitance,
   then the sampling switch is turned OFF, the hold capacitance holds the output signal of the amplifier unit,
   then the AD conversion period of the AD conversion unit is started,
   then the corresponding pixel outputs the pixel signal based on the photoelectric conversion, and
   then the AD conversion period of the AD conversion unit ends.

6. The image capturing apparatus according to claim 4, wherein,
   when the pixels are outputting reset noise signals, the sampling switch is turned ON, the output signal of the amplifier unit is written in the hold capacitance,
   then the sampling switch is turned OFF, the hold capacitance holds the output signal of the amplifier unit,
   then the AD conversion period of the AD conversion unit is started,
   then the pixels output pixel signals based on the photoelectric conversion, and
   then the AD conversion period of the AD conversion unit ends.

7. The image capturing apparatus according to claim 1, wherein the readout circuit includes a buffer circuit connected to the hold capacitance.

8. The image capturing apparatus according to claim 3, wherein
   the AD conversion unit includes:
   a plurality of comparators configured to compare a reference signal of which potential changes with time, with the output signals of the plurality of readout circuits;
   a counter circuit configured to count a counted value and output count data; and
   a storage unit configured to hold the count data in accordance with a comparison result of the comparators.

9. An image capturing system comprising:
   the image capturing apparatus according to claim 1; and
   an optical unit configured to focus light on the image capturing apparatus.

* * * * *